United States Patent
Lee et al.

(10) Patent No.: US 10,309,768 B2
(45) Date of Patent: Jun. 4, 2019

(54) PROFILE MEASURING METHOD, PROFILE MEASURING APPARATUS, AND DEFORMATION DETECTING APPARATUS

(71) Applicant: UTECHZONE CO., LTD., New Taipei (TW)

(72) Inventors: Yueh-Long Lee, New Taipei (TW); Po-Tsung Lin, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 78 days.

(21) Appl. No.: 15/585,173

(22) Filed: May 3, 2017

(65) Prior Publication Data

US 2018/0164094 A1 Jun. 14, 2018

(30) Foreign Application Priority Data

Dec. 13, 2016 (TW) .............................. 105141153 A

(51) Int. Cl.
| | |
|---|---|
| *G01B 11/25* | (2006.01) |
| *G06T 7/00* | (2017.01) |
| *G01B 11/24* | (2006.01) |
| *G06T 7/62* | (2017.01) |

(52) U.S. Cl.
CPC ...... *G01B 11/2408* (2013.01); *G01B 11/2433* (2013.01); *G06T 7/62* (2017.01); *G06T 2207/30164* (2013.01)

(58) Field of Classification Search
CPC .......... G01B 11/25; G06T 2207/30108; G06T 7/0004; G06T 2207/30224
See application file for complete search history.

(56) References Cited

U.S. PATENT DOCUMENTS

| | | | | |
|---|---|---|---|---|
| 5,684,851 | A * | 11/1997 | Kurbatov | G01N 23/046 378/149 |
| 8,228,509 | B2 * | 7/2012 | Akamatsu | G01B 11/24 356/610 |
| 2011/0228082 | A1 * | 9/2011 | Wen | G01B 11/2518 348/139 |
| 2012/0105867 | A1 * | 5/2012 | Komatsu | G01B 11/25 356/610 |
| 2015/0243039 | A1 * | 8/2015 | Holz | G06K 9/3233 345/8 |
| 2017/0184491 | A1 * | 6/2017 | Chern | G01N 21/21 |
| 2018/0045629 | A1 * | 2/2018 | Hoell | G01B 21/16 |

* cited by examiner

*Primary Examiner* — Tsion B Owens
(74) *Attorney, Agent, or Firm* — JCIPRNET

(57) ABSTRACT

A profile measuring method used to measure a profile of an object-under-test includes the following steps. A light source, a light-transmissive projection film, and an image capturing device are provided, where the light-transmissive projection film is located between the light source and the image capturing device. The object-under-test is placed between the light source and the light-transmissive projection film, and a light beam is provided toward the light-transmissive projection film by the light source, to form an object-under-test projection of the object-under-test on the light-transmissive projection film. An image of the object-under-test projection is captured by the image capturing device, to obtain a projection size of the object-under-test projection. A measuring size of the object-under-test is calculated according to the projection size of the object-under-test projection. In addition, a profile measuring apparatus and a deformation detecting apparatus are also provided.

20 Claims, 5 Drawing Sheets

PROFILE MEASURING METHOD, PROFILE MEASURING APPARATUS, AND DEFORMATION DETECTING APPARATUS

CROSS-REFERENCE TO RELATED APPLICATION

This application claims the priority benefit of Taiwan application serial no. 105141153, filed on Dec. 13, 2016. The entirety of the above-mentioned patent application is hereby incorporated by reference herein and made a part of this specification.

BACKGROUND OF THE INVENTION

1. Field of the Invention

The present invention generally relates to a measuring method, a measuring apparatus, and a detecting apparatus, in particular, to a profile measuring method, a profile measuring apparatus, and a deformation detecting apparatus.

2. Description of Related Art

Roundness tests are generally performed on ball products (such as basketballs and baseballs) to determine whether profiles of the balls are expected. The tests may be performed by means of manual measuring, or image capturing.

FIG. 1 is a schematic diagram of performing a roundness test by means of image capturing in the prior art. As shown in FIG. 1, when a roundness test is performed on a ball-shaped object-under-test 50 by means of image capturing, limited by a visual angle between an image capturing device 60 and the ball-shaped object-under-test 50, the image capturing device 60 can only capture a profile of the ball-shaped object-under-test 50 between a position M and a position M', and cannot capture a profile of the ball-shaped object-under-test 50 between a position N and a position N'. Therefore, if a roundness test is performed by using the manner shown in FIG. 1, the image capturing device 60 cannot accurately perform image capturing on a profile of the ball-shaped object-under-test 50 that has the largest outer diameter (a profile between the position N and the position N'), and in this case, cannot accurately and comprehensively measure a size and roundness of the ball-shaped object-under-test 50.

SUMMARY OF THE INVENTION

The present invention provides a measuring method, a measuring apparatus, and a detecting apparatus, so that an image capturing device can accurately perform image capturing on a profile of a ball-shaped object-under-test that has the largest outer diameter.

A profile measuring method of the present invention for measuring a profile of an object-under-test includes the following steps. A light source, a light-transmissive projection film, and an image capturing device are provided, where the light-transmissive projection film is located between the light source and the image capturing device. The object-under-test is placed between the light source and the light-transmissive projection film, and a light beam is provided toward the light-transmissive projection film by the light source, to form an object-under-test projection of the object-under-test on the light-transmissive projection film. An image of the object-under-test projection is captured by the image capturing device, to obtain a projection size of the object-under-test projection. A measuring size of the object-under-test is calculated according to the projection size of the object-under-test projection.

A profile measuring device of the present invention for measuring a profile of an object-under-test includes a light source, a light-transmissive projection film, a driving unit, and an image capturing device. The light source provides a light beam toward the object-under-test. The light-transmissive projection film enables the light beam projected toward the object-under-test to form an object-under-test projection on a side of the light-transmissive projection film. The driving unit is configured in an object-under-test placing area, and is configured to drive the object-under-test. The image capturing device is located at another side of the light-transmissive projection film, and is configured to capture an image of the object-under-test projection, to obtain a projection size of the object-under-test projection.

Based on the foregoing, in the present invention, the light beam provided by the light source forms an object-under-test projection on the light-transmissive projection film, so that the image capturing device can capture the object-under-test projection on the light-transmissive projection film. For the image capturing device, the object-under-test projection on the light-transmissive projection film is a planar image, and therefore the image capturing device can accurately perform image capturing on a profile of the object-under-test projection that has the largest outer diameter, and accurately and comprehensively calculate a measuring size and roundness of the object-under-test according to the profile of the object-under-test projection that has the largest outer diameter and a projection size of the object-under-test projection.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
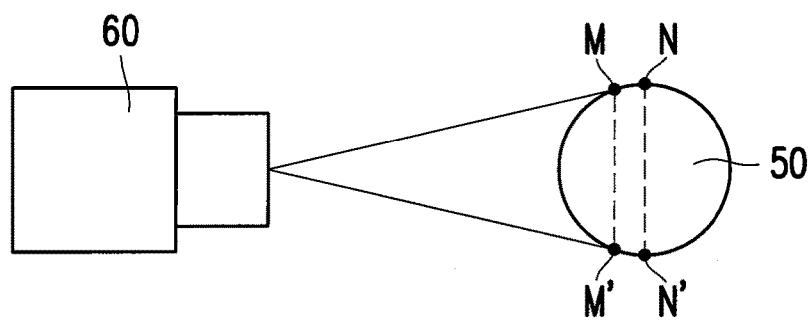
FIG. 1 is a schematic diagram of performing a roundness test by means of image capturing in the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
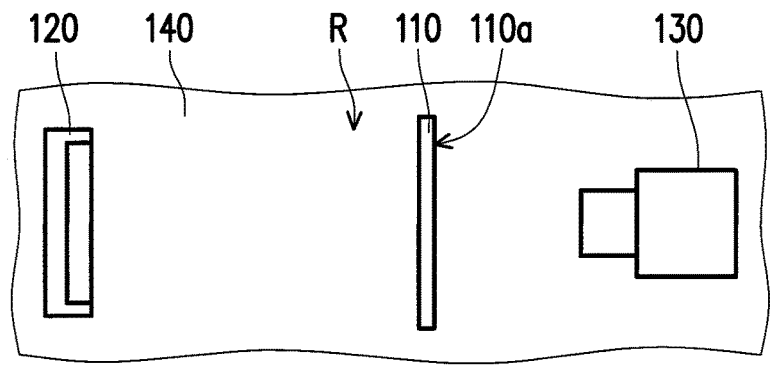
FIG. 2 is a top view of a profile measuring device according to an embodiment of the present invention.
Figure 3:
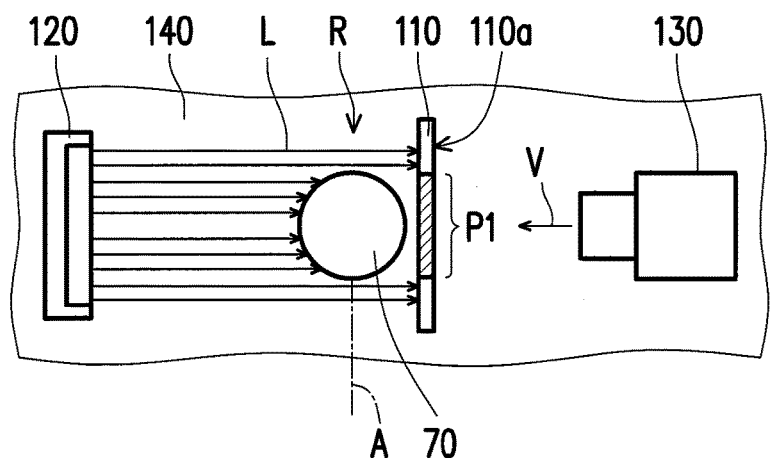
FIG. 3 shows the profile measuring device in FIG. 2 performing measuring on an object-under-test.

FIG. 2 is a top view of a profile measuring device according to an embodiment of the present invention. FIG. 3 shows the profile measuring device in FIG. 2 performing measuring on an object-under-test. Referring to FIG. 2 and FIG. 3, the profile measuring device 100 in the present embodiment includes a light-transmissive projection film 110, a light source 120, and an image capturing device 130. The light-transmissive projection film 110 includes but is not limited to a translucent film made of a plastic material. The light source 120 includes but is not limited to a light source having high directivity, and is configured to provide a light beam that is nearly parallel light. The image capturing device 130 includes but is not limited to a charge coupled device (CCD) camera device. The light-transmissive projection film 110, the light source 120, and the image capturing device 130 are configured on a base 140, and the light-transmissive projection film 110 is located between the light source 120 and the image capturing device 130.

There is an object-under-test placing area R between the light source 120 and the light-transmissive projection film 110, and the object-under-test placing area R is used to place an object-under-test 70 shown in FIG. 3. As shown in FIG. 3, the light source 120 is configured to provide a light beam L having high directivity toward the light-transmissive projection film 110, to form an object-under-test projection P1 of the object-under-test 70 on a surface 110a of the light-transmissive projection film 110, where the surface 110a of the light-transmissive projection film 110 is a plane. The image capturing device 130 is configured to capture an image of the object-under-test projection P1, to obtain at least one projection size of the object-under-test projection P1, where a light axis of a lens of the image capturing device 130 runs through a geometric center of the object-under-test 70.

Figure 4:
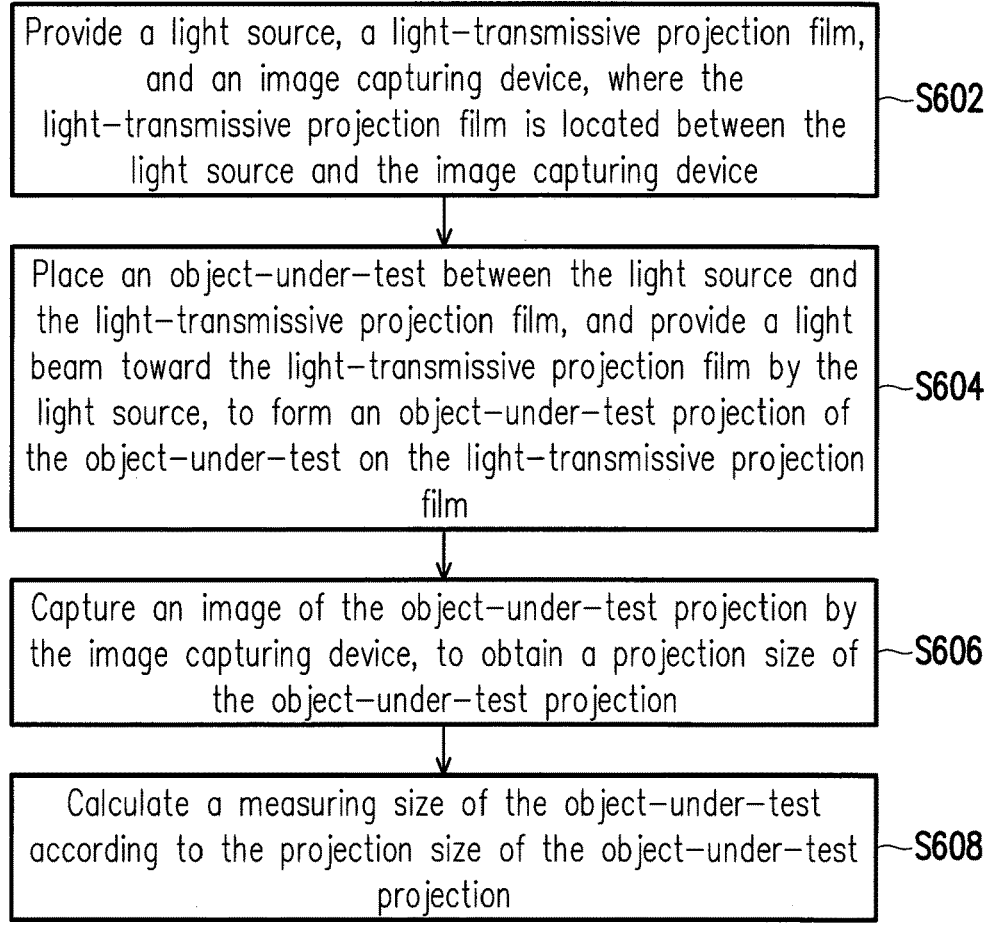
FIG. 4 is a flowchart of a profile measuring method according to an embodiment of the present invention.

The following makes description of a profile measuring method according to an embodiment of the present invention by means of a drawing. FIG. 4 is a flowchart of the profile measuring method according to the embodiment of the present invention. Referring to FIG. 2 and FIG. 4, first, a light source 120, a light-transmissive projection film 110, and an image capturing device 130 are provided, where the light-transmissive projection film 110 is located between the light source 120 and the image capturing device 130 (step S602). Then, an object-under-test 70 is placed between the light source 120 and the light-transmissive projection film 110, and the light source 120 provides a light beam L toward the light-transmissive projection film 110, to form an object-under-test projection P1 of the object-under-test 70 on the light-transmissive projection film 110 (step S604), where the light source 120, for example, provides the light beam L having directivity. An image of the object-under-test projection P1 is captured by the image capturing device 130, to obtain a projection size of the object-under-test projection P1 (step S606). A measuring size of the object-under-test 70 is calculated according to the projection size of the object-under-test projection P1 (step S608).

By means of the foregoing configuration and measuring manner, for the image capturing device 130, the object-under-test projection P1 on the light-transmissive projection film 110 is a planar image, and therefore the image capturing device 130 can accurately perform image capturing on a profile of the object-under-test projection that has the largest outer diameter, and accurately and comprehensively calculate a measuring size and roundness of the object-under-test 70 according to the profile of the object-under-test projection P1 that has the largest outer diameter and a projection size of the object-under-test projection P1. In addition, the light beam provided by the light source 120 is a light beam having high directivity, thereby avoiding that measuring accuracy is lowered because of high divergence of light beams.

Further, in step S606, the manner of obtaining a projection size of the object-under-test projection is, for example, as follows. An image of one scale is captured by the image capturing device 130, and a size of one pixel of the image capturing device 130 is obtained by taking the captured image of the scale as standard. The projection size of the object-under-test projection P1 could be calculated according to a quantity of pixels corresponding to the image of the object-under-test projection P1 captured by the image capturing device 130 and the size of one pixel. For example, if the size of one pixel that is obtained by using the foregoing manner is 76.3 µm, and a quantity of pixels in a direction that corresponds to the image of the object-under-test projection P1 captured by the image capturing device 130 is 4178, then the projection size of the object-under-test projection P1 in the direction may be calculated as a product of 76.3 µm and 4178, that is, about 318.8 mm.

Figure 5:
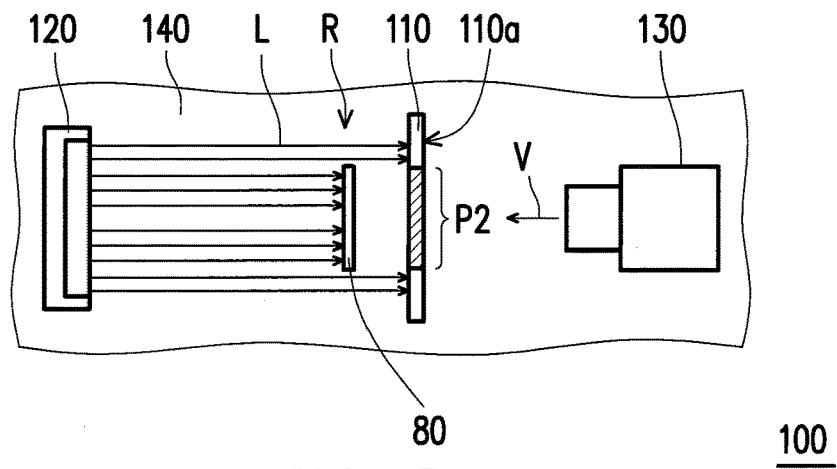
FIG. 5 shows the profile measuring device in FIG. 2 performing adjustment.

In addition, in step S608, a manner of calculating the measuring size of the object-under-test 70 is, for example, as follows. FIG. 5 shows the profile measuring device in FIG. 2 performing adjustment. Referring to FIG. 5, a standard object-under-test 80 is placed between the light source 120 and the light-transmissive projection film 110, the standard object-under-test 80 needs to be placed in a position of a rotating axis A in FIG. 3, and the standard object-under-test 80 may be any standard object-under-test and has a standard size. The light source 120 provides a light beam L toward the light-transmissive projection film 110, to form a standard object-under-test projection P2 of the standard object-under-test 80 on the light-transmissive projection film 110. The image capturing device 130 captures an image of the standard object-under-test projection P2, to obtain a projection size of the standard object-under-test projection. By doing this, an adjustment parameter may be obtained by comparing the standard size of the standard object-under-test 80 and the projection size of the standard object-under-test projection P2. Therefore, the measuring size of the object-under-test 70 may be calculated according to the projection size of the object-under-test projection P1 and the adjustment parameter. For example, if the standard size of the standard object-under-test 80 in a direction is 150 mm, and the projection size of the standard object-under-test projection P2 in the direction is 159.4 mm, then the adjustment parameter is defined as a ratio of the two size values, that is, 1.063. Based on the foregoing, if the projection size of the object-under-test projection P1 in a direction is 318.8 mm, then the measuring size of the object-under-test 70 in the direction is a quotient of 318.8 mm and 1.063, that is, about 300 mm.

In the foregoing adjustment process, the manner of obtaining the projection size of the standard object-under-test projection P2 is, for example, as follows. The image capturing device 130 captures an image of one scale, and a size of one pixel of the image capturing device 130 is obtained by taking the captured image of the scale as standard. The projection size of the standard object-under-test projection P2 is calculated according to a quantity of pixels corresponding to the image of the standard object-under-test projection P2 that is captured by the image capturing device 130. For example, if the size of one pixel that is obtained by using the foregoing manner is 76.3 μm, and a quantity of pixels in a direction that corresponds to the image of the object-under-test projection P2 captured by the image capturing device 130 is 2089, then the projection size of the image of the standard object-under-test projection P2 in the direction may be calculated as a product of 76.3 μm and 2089, that is, about 159.4 mm.

Figure 6:
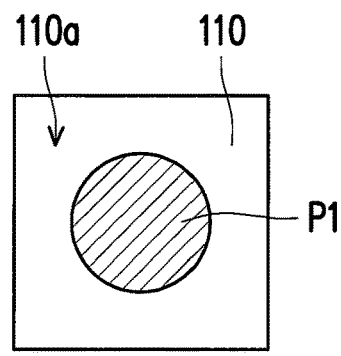
FIG. 6 is a front view of a light-transmissive projection film in FIG. 3 from a visual angle V.

FIG. 6 is a front view of a light-transmissive projection film in FIG. 3 from a visual angle V. Referring to FIG. 3 and FIG. 6, the object-under-test 70 in the present embodiment is, for example, a ball-shaped object, and correspondingly, a profile of the object-under-test projection P1 on the light-transmissive projection film 110 is in a circular shape. In other embodiments, the object-under-test may be in other proper shapes, which is not limited in the present invention. In addition, in step S604, when the light source 120 provides a light beam, a proper driving unit may drive the object-under-test 70 to rotate around the rotating axis A that is parallel to the light-transmissive projection film 110, so that the image capturing device 130 can completely perform image capturing on a profile of the object-under-test 70, to obtain size information of the profile of the object-under-test 70, such as a diameter and a circumference length.

Figure 7:
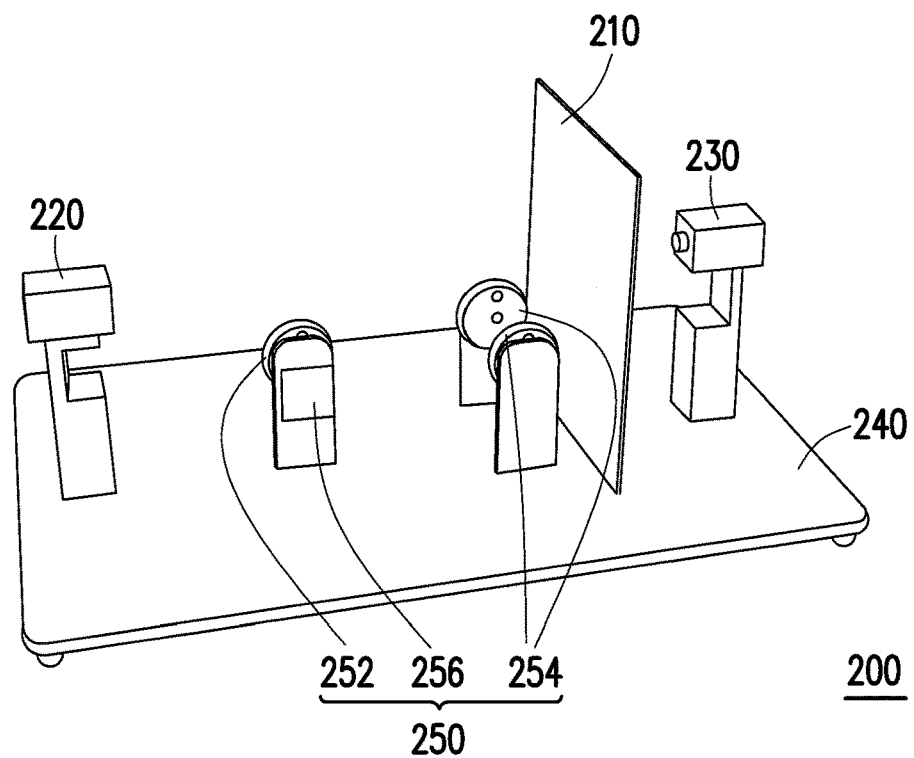
FIG. 7 is a three-dimensional view of a profile measuring device according to another embodiment of the present invention.
Figure 8:
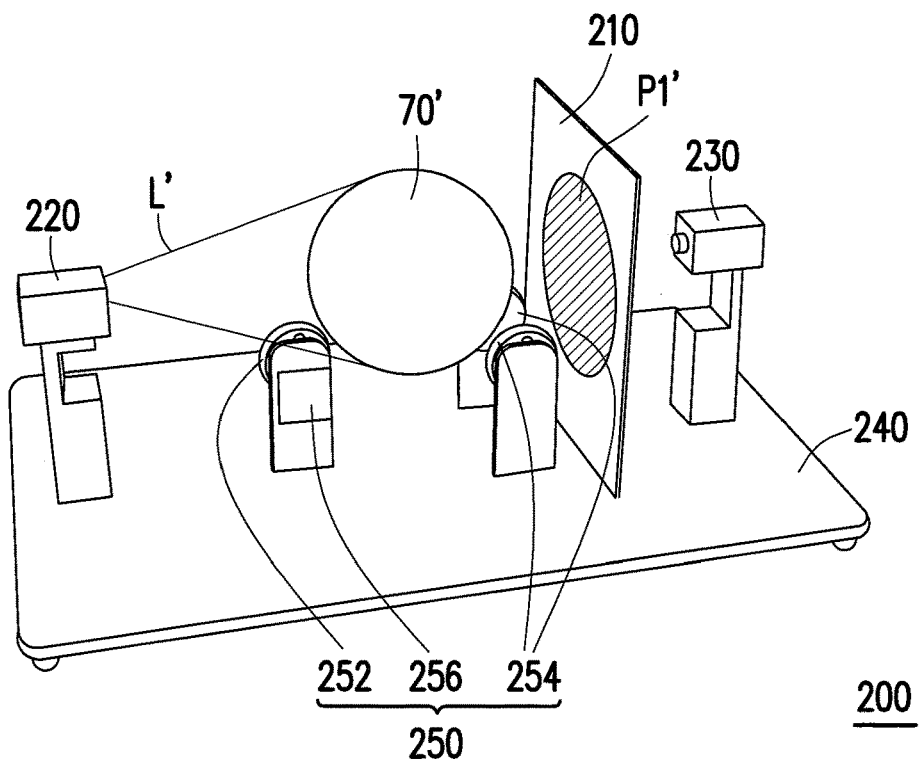
FIG. 8 is a schematic diagram of the profile measuring device in FIG. 7 performing measuring on an object-under-test.

The following makes description of a working manner of the driving unit by means of a drawing. FIG. 7 is a three-dimensional view of a profile measuring device according to another embodiment of the present invention. FIG. 8 is a schematic diagram of the profile measuring device in FIG. 7 performing measuring on an object-under-test. For a profile measuring device 200 in FIG. 7 and FIG. 8, configuration and working manners of a light-transmissive projection film 210, a light source 220, an image capturing device 230, a base 240, an object-under-test 70', an object-under-test projection P1', and a light beam L' are similar to configuration and working manners of the light-transmissive projection film 110, the light source 120, the image capturing device 130, the base 140, the object-under-test 70, the object-under-test projection P1, the light beam L from FIG. 2 to FIG. 6, and the descriptions thereof are omitted herein. A driving unit 250 in the profile measuring device 200 includes multiple scroll wheels 252 and 254, and the scroll wheels 252 and 254 are configured to carry the object-under-test 70' and rotate, to drive the object-under-test 70' to rotate. Specifically, the driving unit 250 further includes a motor 256, a quantity of the scroll wheel 252 is one, and the scroll wheel 252 is a driving scroll wheel driven by the motor 256; and a quantity of the scroll wheels 254 is two, and the scroll wheels 254 are driven scroll wheels. In other embodiments, the driving unit may be in other proper forms, which is not limited in the present invention.

Figure 9:
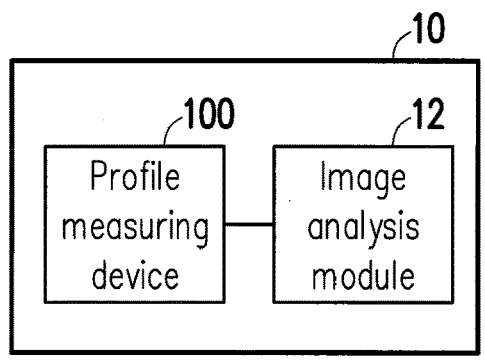
FIG. 9 shows the profile measuring device in FIG. 2 being applied to a deformation detecting apparatus.

The profile measuring device in the foregoing embodiment may be applied to a deformation detecting apparatus, to detect roundness of an object-under-test. The following makes description by using the profile measuring device 100 shown in FIG. 2 as an example. FIG. 9 shows the profile measuring device in FIG. 2 being applied to a deformation detecting apparatus. Referring to FIG. 9, a deformation detecting apparatus 10 of the present embodiment includes a profile measuring device 100 in FIG. 2 and an image analysis module 12. The image analysis module 12 is configured to analyze a deformation degree of the object-under-test 70 according to the size of the object-under-test 70, and the deformation degree is, for example, roundness of a ball-shaped object (the object-under-test 70). Specifically, the profile measuring device 100 may obtain multiple diameter values of a ball-shaped object (the object-under-test 70) by using the foregoing measuring manner, so that the image analysis module 12 may determine whether the roundness of the ball-shaped object meets a standard requirement according to consistency of the diameter values of the ball-shaped object (the object-under-test 70), or determine whether the roundness of the ball-shaped object (the object-under-test 70) meets the standard requirement through other proper manners, which is not limited in the present invention.

Based on the foregoing, in the present invention, an object-under-test projection is formed on a light-transmissive projection film by using a light source, so that a image capturing device can capture the object-under-test projection on the light-transmissive projection film. For the image capturing device, the object-under-test projection on the light-transmissive projection film is a planar image, and therefore the image capturing device can accurately perform image capturing on a profile of the object-under-test projection that has the largest outer diameter, and accurately and comprehensively calculate a measuring size and roundness of the object-under-test according to the profile of the object-under-test projection that has the largest outer diameter and a projection size of the object-under-test projection. In addition, a projection size of a standard object-under-test whose measuring size is known is obtained by using the profile measuring device, so as to define an adjustment parameter of the profile measuring device according to the measuring size and the projection size of the standard object-under-test, and accurately calculate a measuring size of an object-under-test according to the projection size of the object-under-test projection and the adjustment parameter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A profile measuring method, configured to measure a profile of an object-under-test, comprising:
   providing a light source, a light-transmissive projection film, and an image capturing device, wherein the light-transmissive projection film is located between the light source and the image capturing device;
   placing the object-under-test between the light source and the light-transmissive projection film, and providing a light beam toward the light-transmissive projection film by the light source to form an object-under-test projection on the light-transmissive projection film;
   capturing an image of the object-under-test projection by the image capturing device to obtain a projection size of the object-under-test projection; and
   calculating a measuring size of the object-under-test according to the projection size of the object-under-test projection.

2. The profile measuring method according to claim 1, wherein the step of calculating the measuring size of the object-under-test comprises:
   calculating the measuring size of the object-under-test according to the projection size of the object-under-test and an adjustment parameter.

3. The profile measuring method according to claim 2, wherein the adjustment parameter is obtained by means of the following steps, comprising:
   placing a standard object-under-test between the light source and the light-transmissive projection film, wherein the standard object-under-test has a standard size;

providing the light beam toward the light-transmissive projection film by the light source to form a standard object-under-test objection on the light-transmissive projection film;

capturing an image of the standard object-under-test projection by the image capturing device to obtain a projection size of the standard object-under-test projection; and comparing the standard size with the projection size of the standard object-under-test to obtain the adjustment parameter.

4. The profile measuring method according to claim 3, wherein the step of obtaining the standard size comprises:

capturing an image of a scale by the image capturing device to obtain a size of one pixel of the image capturing device; and calculating the standard size according to a quantity of pixels corresponding to an image of the standard object-under-test projection captured by the image capturing device.

5. The profile measuring method according to claim 1, wherein the step of obtaining the projection size of the object-under-test projection comprises:

capturing an image of a scale by the image capturing device, to obtain a size of one pixel of the image capturing device; and calculating the projection size of the object-under-test projection according to a quantity of pixels corresponding to an image of the object-under-test projection captured by the image capturing device.

6. The profile measuring method according to claim 1, comprising: analyzing a deformation degree of the object-under-test by an image analysis module according to the measuring size of the object-under-test.

7. The profile measuring method according to claim 5, wherein the object-under-test includes a ball-shaped object, and wherein the step of analyzing the deformation degree of the object-under-test includes analyzing roundness of the object-under-test according to the measuring size of the object-under-test.

8. The profile measuring method according to claim 1, comprising: driving the object-under-test to rotate by a driving unit when the light source provides the light beam.

9. The profile measuring method according to claim 7, wherein the step of driving the object-under-test to rotate comprises: driving the object-under-test to rotate around a rotating axis parallel to the light-transmissive projection film.

10. The profile measuring method according to claim 1, wherein the step of providing the light beam by the light source comprises: providing the light beam having directivity by the light source.

11. A profile measuring device, configured to measure a profile of an object-under-test, comprising:

a light source configured to provide a light beam toward the object-under-test;

a light-transmissive projection film configured to form an object-under-test projection on a side of the light-transmissive projection film;

a driving unit configured in an object-under-test placing area, and configured to drive the object-under-test; and an image capturing device located at another side of the light-transmissive projection film, and configured to capture an image of the object-under-test projection to obtain a projection size of the object-under-test projection, wherein at least one measuring size of the object-under-test is obtained though calculation according to the projection size of the object-under-test projection.

12. The profile measuring device according to claim 11, wherein the driving unit is configured to drive the object-under-test to rotate around a rotating axis parallel to the light-transmissive projection film.

13. The profile measuring device according to claim 11, wherein the driving unit comprises multiple scroll wheels, and the scroll wheels are configured to carry the object-under-test and rotate, to drive the object-under-test to rotate.

14. The profile measuring device according to claim 11, wherein the light source is configured to provide the light beam having directivity.

15. A deformation detecting apparatus, comprising:

a light-transmissive projection film;

a light source, wherein an object-under-test placing area is located between the light source and the light-transmissive projection film, the object-under-test placing area is used to place an object-under-test, and the light source is configured to provide a light beam toward the light-transmissive projection film, to form an object-under-test projection of the object-under-test on the light-transmissive projection film; and an image capturing device, wherein the light-transmissive projection film is located between the light source and the image capturing device, and the image capturing device is configured to capture an image of the object-under-test projection, to obtain at least one size of the object-under-test projection; and an image analysis module, wherein at least one size of the object-under-test is obtained though calculation according to the size of the object-under-test projection, and the image analysis module is configured to analyze a deformation degree of the object-under-test according to the size of the object-under-test.

16. The deformation detecting apparatus according to claim 15, wherein the object-under-test is a ball-shaped object, and the image analysis module is configured to analyze roundness of the object-under-test according to the size of the object-under-test.

17. The deformation detecting apparatus according to claim 15, wherein the profile measuring device comprises a driving unit, and the driving unit is configured in the object-under-test placing area and is configured to drive the object-under-test to rotate.

18. The deformation detecting apparatus according to claim 17, wherein the driving unit is configured to drive the object-under-test to rotate around a rotating axis parallel to the light-transmissive projection film.

19. The deformation detecting apparatus according to claim 17, wherein the driving unit comprises multiple scroll wheels, and the scroll wheels are configured to carry the object-under-test and rotate, to drive the object-under-test to rotate.

20. The deformation detecting apparatus according to claim 15, wherein the light source is configured to provide the light beam having directivity.

* * * * *